(12) United States Patent
Argue et al.

(10) Patent No.: US 8,874,471 B2
(45) Date of Patent: Oct. 28, 2014

(54) RETAIL LOSS PREVENTION USING BIOMETRIC DATA

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/753,409

(22) Filed: Jan. 29, 2013

(65) Prior Publication Data

US 2014/0214568 A1 Jul. 31, 2014

(51) Int. Cl.
| | |
|---|---|
| G06Q 10/00 | (2012.01) |
| G06K 9/00 | (2006.01) |
| H04N 5/232 | (2006.01) |
| G06Q 20/20 | (2012.01) |
| G06Q 20/40 | (2012.01) |

(52) U.S. Cl.
CPC .......... *G06Q 20/4016* (2013.01); *G06Q 20/206* (2013.01)
USPC .......... 705/18; 348/211.99; 382/118

(58) Field of Classification Search
USPC .......................................................... 705/18
See application file for complete search history.

(56) References Cited

U.S. PATENT DOCUMENTS

| | | | | |
|---|---|---|---|---|
| 4,630,110 | A * | 12/1986 | Cotton et al. | 348/153 |
| 6,236,736 | B1 * | 5/2001 | Crabtree et al. | 382/103 |
| 7,416,117 | B1 * | 8/2008 | Morrison | 235/383 |
| 7,780,081 | B1 * | 8/2010 | Liang | 235/383 |
| 8,259,175 | B2 * | 9/2012 | Bobbitt et al. | 348/150 |
| 8,448,858 | B1 * | 5/2013 | Kundu et al. | 235/383 |
| 8,474,715 | B2 * | 7/2013 | Goncalves | 235/383 |
| 2002/0170782 | A1 * | 11/2002 | Millikan | 186/61 |
| 2003/0018897 | A1 * | 1/2003 | Bellis et al. | 713/182 |
| 2003/0048926 | A1 * | 3/2003 | Watanabe | 382/103 |
| 2003/0102373 | A1 * | 6/2003 | Swartz et al. | 235/383 |
| 2003/0122667 | A1 * | 7/2003 | Flynn | 340/540 |
| 2003/0167153 | A1 * | 9/2003 | Alexander | 702/189 |
| 2004/0111324 | A1 * | 6/2004 | Kim | 705/22 |
| 2004/0117638 | A1 * | 6/2004 | Monroe | 713/186 |
| 2004/0133477 | A1 * | 7/2004 | Morris et al. | 705/21 |
| 2005/0010808 | A1 * | 1/2005 | Wixson et al. | 713/200 |
| 2005/0102183 | A1 * | 5/2005 | Kelliher et al. | 705/16 |
| 2005/0177859 | A1 * | 8/2005 | Valentino et al. | 725/105 |
| 2005/0265582 | A1 * | 12/2005 | Buehler et al. | 382/103 |
| 2006/0028556 | A1 * | 2/2006 | Bunn et al. | 348/211.99 |

(Continued)

*Primary Examiner* — Matthew Gart
*Assistant Examiner* — Ashford S Hayles
(74) *Attorney, Agent, or Firm* — David R. Stevens; Stevens Law Group

(57) ABSTRACT

Systems and methods are disclosed herein for estimating the risk of criminal activity in a retail setting. Using video data, biometric data for an individual may be obtained. A baseline biometric measurement is taken upon enqueuing of an individual, which may include entry of the individual into the field of view of a camera having a point of sale (POS) in its field of view. A biometric measurement is also taken when the individual is adjacent the POS. According to an analysis of these measurements, an estimate of risk is calculated, such as by comparing the baseline measurement to a POS measurement. Based on this risk assessment, an alert may be generated. The alert may be a graphical indicator displayed on the POS or transmitted to a device operated by a store representative. The risk assessment may also be used to select transactions for auditing in a self-checkout system.

20 Claims, 6 Drawing Sheets

(56) References Cited

U.S. PATENT DOCUMENTS

| | | | |
|---|---|---|---|
| 2006/0243798 A1* | 11/2006 | Kundu et al. | 235/383 |
| 2007/0182818 A1* | 8/2007 | Buehler | 348/143 |
| 2008/0018738 A1* | 1/2008 | Lipton et al. | 348/143 |
| 2008/0083018 A1* | 4/2008 | Prokupets et al. | 726/4 |
| 2008/0169929 A1* | 7/2008 | Albertson et al. | 340/573.1 |
| 2008/0204558 A1* | 8/2008 | Goldman et al. | 348/153 |
| 2008/0221828 A1* | 9/2008 | Braunstein | 702/155 |
| 2009/0006286 A1* | 1/2009 | Angell et al. | 706/12 |
| 2009/0076922 A1* | 3/2009 | de Gruil | 705/16 |
| 2009/0089107 A1* | 4/2009 | Angell et al. | 705/7 |
| 2009/0234683 A1* | 9/2009 | Anderson et al. | 705/7 |
| 2010/0059589 A1* | 3/2010 | Goncalves et al. | 235/383 |
| 2010/0114623 A1* | 5/2010 | Bobbitt et al. | 705/7 |
| 2010/0134624 A1* | 6/2010 | Bobbitt et al. | 348/150 |
| 2010/0145899 A1* | 6/2010 | Buehler | 706/47 |
| 2010/0156630 A1* | 6/2010 | Ainsbury | 340/540 |
| 2011/0191195 A1* | 8/2011 | Lipton et al. | 705/16 |
| 2011/0257985 A1* | 10/2011 | Goldstein | 705/1.1 |
| 2011/0279272 A1* | 11/2011 | Wieth et al. | 340/568.5 |
| 2012/0038456 A1* | 2/2012 | Pikkarainen et al. | 340/5.61 |
| 2012/0127316 A1* | 5/2012 | Kundu et al. | 348/150 |
| 2012/0140042 A1* | 6/2012 | Albertson et al. | 348/46 |
| 2012/0197741 A1* | 8/2012 | Carlegren et al. | 705/16 |
| 2012/0253953 A1* | 10/2012 | Aziz et al. | 705/16 |
| 2012/0274777 A1* | 11/2012 | Saptharishi et al. | 348/159 |
| 2012/0293661 A1* | 11/2012 | Bobbitt et al. | 348/150 |
| 2012/0321146 A1* | 12/2012 | Kundu et al. | 382/118 |
| 2013/0085876 A1* | 4/2013 | Mittag | 705/18 |
| 2013/0250115 A1* | 9/2013 | Fan et al. | 348/150 |
| 2013/0265433 A1* | 10/2013 | Kundu et al. | 348/150 |
| 2013/0266227 A1* | 10/2013 | Ding et al. | 382/197 |

\* cited by examiner ved by a store representative. Although this openness and trust reduces the cost of operating a store and conducting transactions, it may result in losses due to theft. In a retail environment, shoplifting is one of the most common crimes and there are very few deterrents. Accordingly, prevention of shoplifting in the least disruptive manner possible is critical for retailers.

RETAIL LOSS PREVENTION USING BIOMETRIC DATA

BACKGROUND

1. Field of the Invention

This invention relates to systems and methods for detecting and preventing shoplifting.

2. Background of the Invention

In most retail environments, the retailer relies extensively on the honesty of patrons. Where the value of items is sold is relatively low, the security measures such as embedded tags or security guards are simply not feasible. The use of self-checkout points of sale (POS) further relies on the integrity of customers. A supervising cashier may perform spot checks or cursorily review transactions. However, the benefit of the self-checkout approach is lost if every single transaction is thoroughly reviewed by a store representative. Although this openness and trust reduces the cost of operating a store and conducting transactions, it may result in losses due to theft. In a retail environment, shoplifting is one of the most common crimes and there are very few deterrents. Accordingly, prevention of shoplifting in the least disruptive manner possible is critical for retailers.

The systems and methods disclosed herein provide an improved approach for detecting shoplifting risk, particularly in a self-checkout or mobile self-checkout environment.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
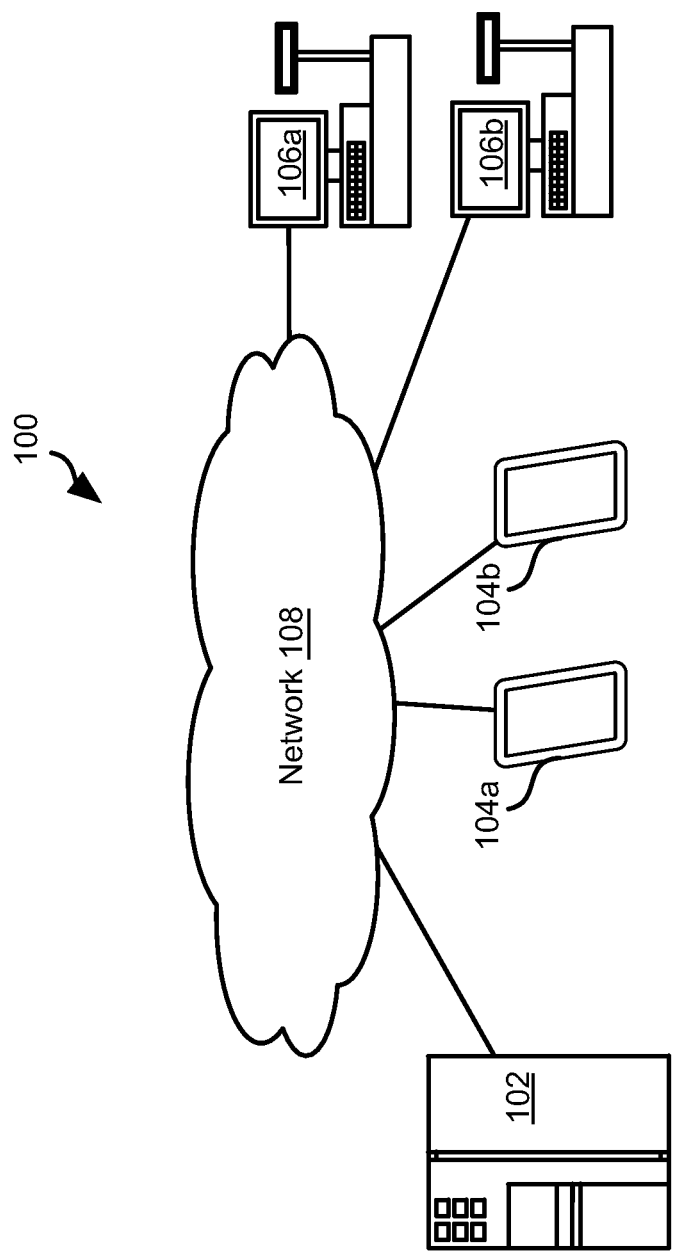
FIG. 1 is a schematic block diagram of a system for methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present application discloses systems and methods for detecting likely shoplifters. A computer system receives a video feed from a camera viewing a point of sale (POS) queue of a store, or some other part of a store. The presence of individuals in the video feed is detected and the biometric data of the detected individuals is measured using the video feed. A baseline biometric measurement at some point prior to reaching a POS is compared to a biometric measurement at the POS. Based on this comparison a shoplifting risk may be calculated and an alert may be generated where appropriate. The methods disclosed herein advantageously do not require an actual identity of the individual to be known or otherwise obtained, even when a risk is detected and alert generated.

In some embodiments, biometric data of individuals is associated with transaction data, such as by identifying the time an individual is detected adjacent a POS in video data and a time associated with a transaction conducted at the POS. The transaction data may be associated with the user through an account of the user, such as an account for providing access to electronic receipts. Transactions, such as self-checkout transactions may be selected for auditing based on the calculated risk for the individual associated with the transaction.

FIG. 1 illustrates a system 100 in which methods described hereinbelow may be implemented. The system 100 may include one or more server system 102 that may each be embodied as one or more server computers each including one or more processors that are in data communication with one another. The server systems 102 may be in data communication with one or more representative computing devices 104a, 104b and one or more point of sale (POS) devices 106a, 106b. In the methods disclosed herein, the representative computing devices 104a, 104b are advantageously mobile devices such as a mobile phone or tablet computer. In some embodiments, some or all of the methods disclosed herein may be performed using a desktop computer or any other computing device as the representative computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity. A POS 106a-106b may be located within a store and may be part of a POS network. In some embodiments, a POS 106a, 106b may be operable to process online transactions. In some embodiments, separate computers of the server system 102 may handle communication with the representative computers 104a, 104b and POS 106a, 106b.

Some or all of the server system 102, representative computers 104a, 104b, and POS 106a, 106b may communicate with one another by means of a network 108. The network 108 may be embodied as a peer-to-peer wireless connection between devices, a connection through a local area network (LAN), WiFi network, the Internet, or any other communication medium or system.

The server system 102 may be associated with a merchant, or other entity, for performing methods as described herein. Alternatively, a separate server system may perform the methods described herein and may be owned or controlled by the same or a different entity than the merchant server system 102.

Figure 2:
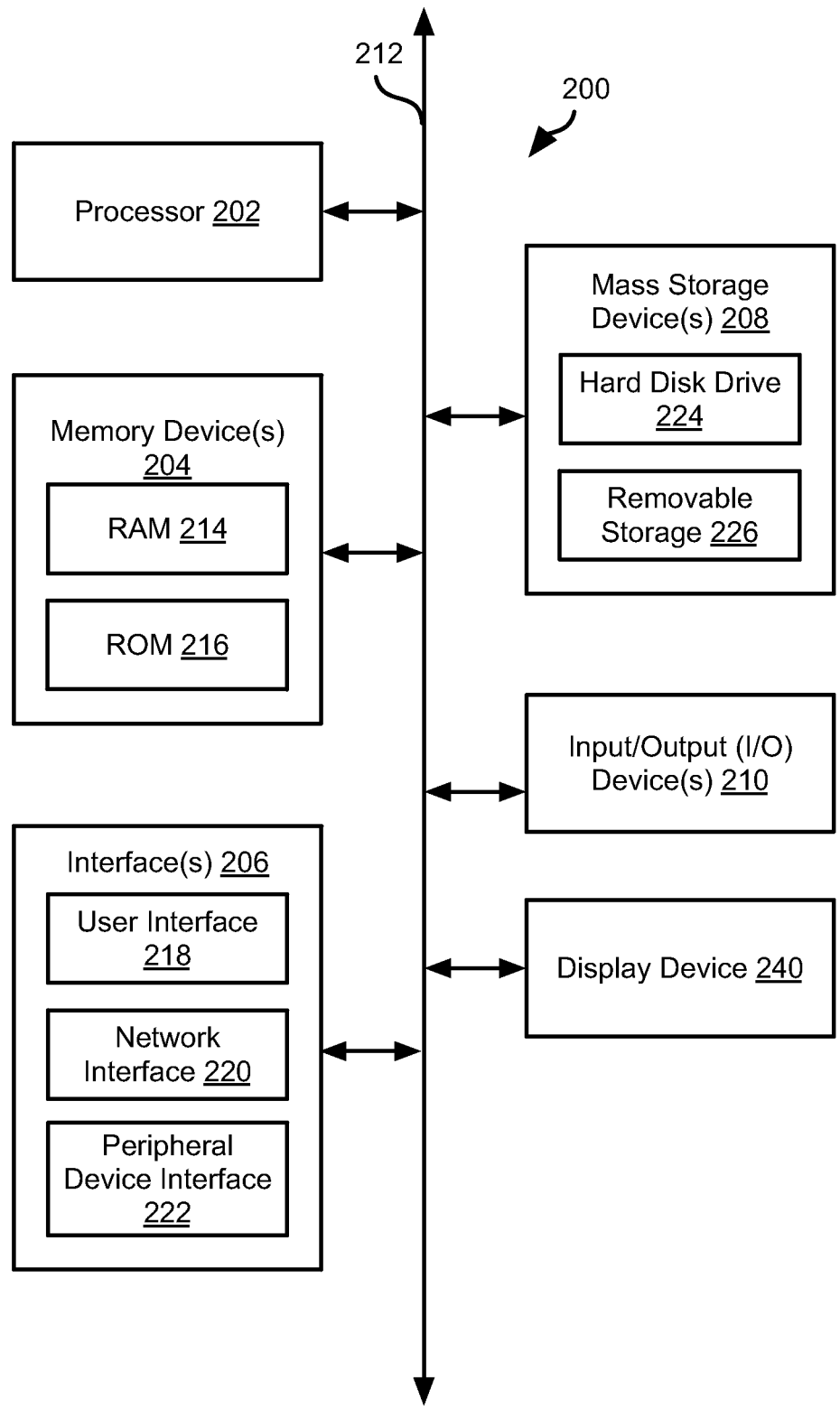
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, representative computer 104a, 104b, and POS 106a, 106b may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
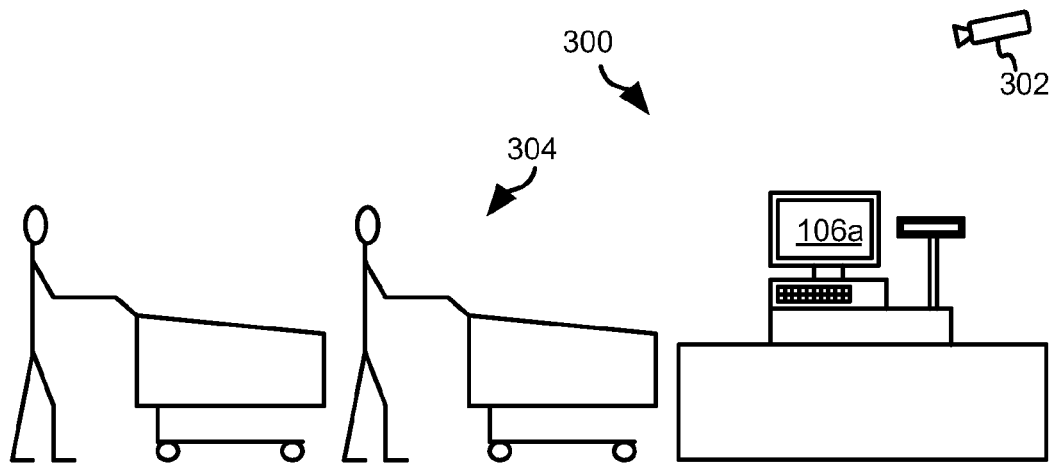
FIG. 3 is a schematic diagram of a point of sale queue suitable for implementing methods in accordance with embodiments of the present invention.

FIG. 3 illustrates a queue system 300 such as may be present at any store. The queue system 300 may include a POS 106a and a camera 302 positioned and oriented to view a customer queue 304, including when the customer is positioned in front of the POS 106a when paying for a transaction. The camera 302 may preferably provide a video output of sufficient resolution to enable both distinguishing individuals in the customer queue 304 and detecting biometric data in the video output. The methods disclosed herein may advantageously use additional cameras 302 located and oriented to view areas other than the queue system 300.

Methods for extracting biometric data from video data may include any known in the art. The biometric data measured may include heart rate, respiration rate, blinking rate, temperature (such as using an infrared camera), or other value. These values may be combined or weighted and combined by addition, multiplication, division, or some other function in order to obtain a characteristic biometric value for an individual. The weightings or function may be determined according to a loss prevention model that is trained using captured data, such as according to methods described herein.

Figure 4:
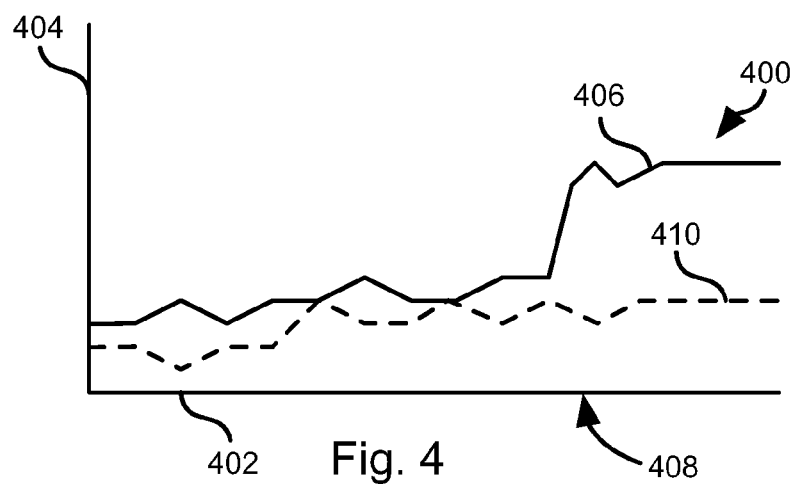
FIG. 4 is a schematic block diagram of a plot of biometric data plotted with respect to queue position for use in accordance with an embodiment of the present invention.

FIG. 4 illustrates a plot 400 of biometric data for an individual as inferred from video data, with the axis 402 representing time or distance and the axis 404 representing a biometric value, such as any of the biometric values discussed herein or a combination thereof.

Attributes of the individual biometric measurements or an aggregation thereof for an individual over time or distance may be used to infer risk that the individual is engaging in criminal activity. For example, a plot 406 exhibits slightly elevated values that increase significantly around a location 408 corresponding to a POS 106a, indicating undue amounts of stress that might indicate criminal activity. In contrast, a plot 410 of biometric values for a normal person may be lower and not exhibit dramatic increases around the location 408 of a POS. One or more of the absolute value of a plot 406, the amount of increases, the percentage increase, the location at which increases or elevated values occur relative to the location 408, or any other attribute of a plot 406 may be used to characterize the risk of criminal activity. These attributes may be evaluated using a loss prevention model, such as a machine learning model, that is trained using gathered biometric data for actual individuals caught shoplifting as well as a test set of individuals that have not engaged in shoplifting.

Figure 5:
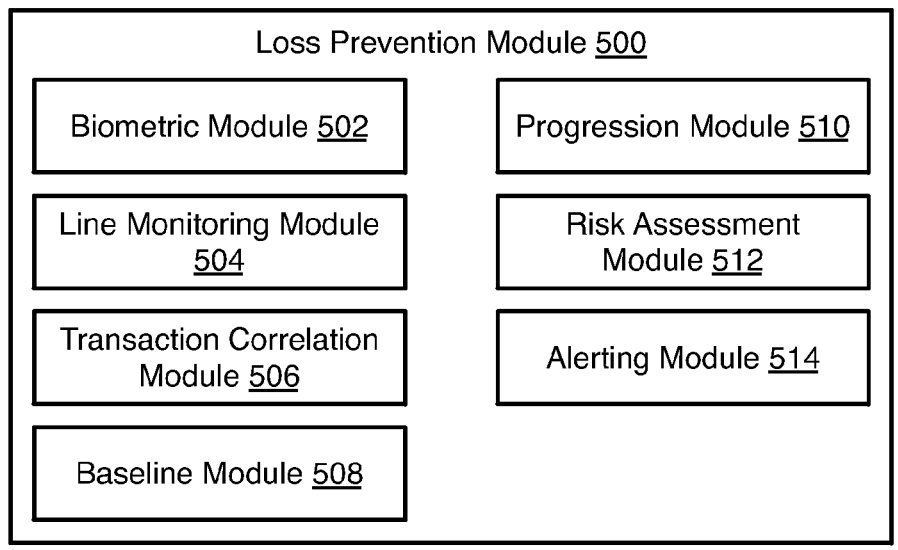
FIG. 5 is a schematic block diagram of a loss prevention module in accordance with an embodiment of the present invention.

FIG. 5 illustrates a loss prevention module 500 that may be hosted or used by a server system 102. The loss prevention module 500 may include a biometric module 502 implementing logic for extracting biometric data from video data. Methods for extracting such data from video data of an individual are known in the art. The loss prevention module may include a line monitoring module 504. The line monitoring module 504 may identify individuals in a video feed. In particular, the line monitoring module 504 may identify individuals as they enter the queue, e.g. enter the field of view of a camera 302, and track movements of each individual as they advance down the queue. In this manner, biometric data trends throughout the duration of an individual's time in a queue can be analyzed in accordance to methods described herein.

A transaction correlation module 506 of the loss prevention module 500 may correlate the biometric data identified for an individual to a specific transaction. For example, the time range during which an individual is positioned adjacent the POS 106a may be noted for an individual. A transaction occurring in that time range at that POS 106a may then be identified. Where the identity of the customer for that transaction is known, the biometric data measured for the individual may accordingly be associated with that customer. For example, a merchant may provide a service that maintains electronic receipts for a customer that may be accessed by the customer or merchant for various purposes. In such circumstances, a customer may supply identification enabling the transaction to be associated with the customer's electronic receipt account. Accordingly, the transaction and the customer identifier are known and the time of the transaction may be used to associate measured biometric data for the customer with the customer identifier.

The loss prevention module 500 may include a baseline module 508 and a progression module 510. The baseline module 508 may establish values for biometric readings for the general population or for a specific individual and the progression module 510 may track the individual within the field of view of a single camera or at different points in the store as detected by multiple cameras. The baseline module 508 may, for example, identify an individual upon entry to a store or to the field of view of a camera 302 having in its field of view the queue system 300 and take a biometric measurement for the individual at that time. This measurement may be used as a baseline measurement. Facial recognition may be used by the progression module 510 to relate the baseline reading to a subsequent reading. In embodiments, such as those that will be described in greater detail herein below, a baseline and subsequent readings are all taken after an individual enters the field of view of a camera and before the individual leaves the field of view. Accordingly, facial recognition is not needed, only tracking of the progression of the shape of the individual in the field of view. In such embodiments, facial recognition may still be used to relate readings at one point in time for an individual to a reading taken at a different time.

The loss prevention module 500 may further include a risk assessment module 512 operable to take as inputs biometric data for an individual, including, for example, a baseline measurement and one or more subsequent measurements obtained for the same individual. The risk assessment module 512 may input these values to a model or function to obtain a risk value that represents an estimate that the individual is engaging in criminal activity, such as in the process of shoplifting. Methods for making this assessment are described in greater detail below.

The loss prevention module 500 may include an alerting module 514 that may generate an alert based on the risk estimate. The generated alert may, for example, be displayed or otherwise output by a representative computing device 104a, 104b carried or otherwise accessed by a store representative or by a POS 106a, 106b.

Figure 6:
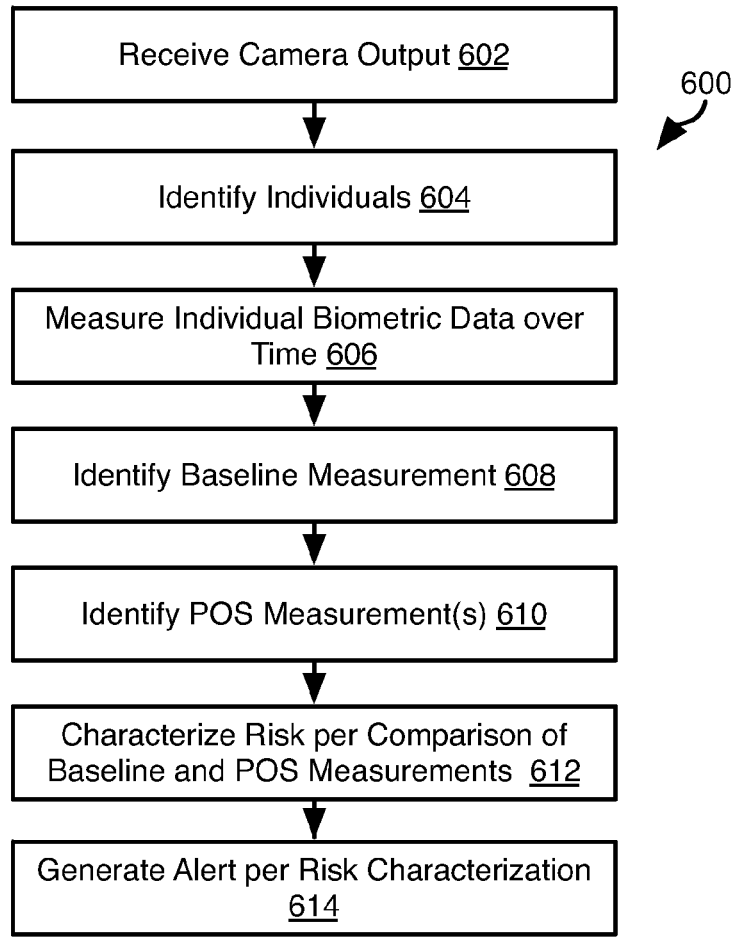
FIG. 6 is a process flow diagram of a method for evaluating risk in accordance with an embodiment of the present invention.

FIG. 6 illustrates a method 600 that may be used to generate a risk assessment. The method 600 may be executed by a server system 102 or some other computing device that is in data communication with one or more cameras 302 and one or both of a representative computing device 104a and a POS 106a.

The method 600 may include receiving 602 the output of one or more cameras and identifying 604 an individual in the field of view of the one or more cameras. Various measurements for an individual may be measured 606 over time. As noted above, this may include measuring biometric data while an individual is in the field of view of a single camera, such as a camera having in its field of view a queue system 300. In some embodiments, as noted above, facial recognition may be used to associate readings from video data of multiple cameras with the same individual. A time associated with the video data may be used to obtain biometric data measurements over time for the same individual. In some embodiments, measuring 606 biometric data for an individual may include zooming in on a particular part of an individual, such as the forehead in order to obtain a pulse rate from observation of veins. In some embodiments, one or more of the pan, tilt, and zoom of the camera may be adjusted to ensure that captured video data for an individual is suitable for measuring of biometric data.

A portion of the measured biometric data may be identified 608 as baseline measurements. For example, where a single camera is used, a baseline measurement may be that measurement corresponding to the first frames of video data in which the individual entered the field of view, where the number of frames is sufficient to obtain a biometric reading. A baseline measurement may also be a measurement taken upon entry in the store by an individual, e.g., the first biometric measurements, or first N biometric measurements, taken for an individual. Where the camera 302 used has in its field of view a queue system 300, entry in the field of view may correspond to enqueuing of the individual. Alternatively or additionally, a baseline measurement may simply be a minimum value, or the lowest N values, for a biometric value among all measurements of that biometric value for an individual.

The method 600 may further include identifying 610 one or more measurements taken in a "POS region." The POS region may include a region around the actual POS 106a of a queue system. For example, a distance of amount X to one or both sides of the POS 106a along a checkout lane. In some embodiments, the POS region may be a temporal region, e.g. biometric measurements taken from video data X seconds before and/or after the individual is at a station immediately in front of the actual POS 106a. Biometric measurements in the POS region may be of interest inasmuch as an individual engaging in criminal activity, e.g. shoplifting, is likely to experience the most stress at this point, particularly if face to face with a cashier.

The method 600 may further include characterizing 612 the risk that an individual poses a risk of criminal activity according to an evaluation of the POS measurements and the baseline measurements. Where the POS measurements are one or more of a threshold amount above the baseline measurements, a threshold percentage above the baseline measurements, and above a threshold value, the individual may be deemed to be a risk. The amount of this risk may be proportion to one or more of the amount by which the POS measurements exceed some or all of these threshold conditions. In some embodiments, characterizing risk may include inputting some or all of the baseline measurements, POS measurements, measurements from other times, into a risk assessment model that relates these parameters to a level of risk. The model may be trained using instances in which shoplifters were caught and biometric data gathered for the shoplifters measured as described hereinabove as well as for biometric data for individuals that were not caught shoplifting or known not to be shoplifting.

An alert may be generated 614 based on the characterization of risk. For example, where the characterization of risk, which may be represented by a numeric value, is above a threshold, an alert may be generated 614. In some embodiments, multiple types of alerts may be generated, where each alert has its own threshold at which it is invoked. In some embodiments, an alert includes sending a message to representative computing device 104a, 104b. The alert may include some or all of an image of the individual for which the alert was generated, a location of the individual, a store identifier, POS identifier, transaction identifier, a numerical value or other description of the estimated level of risk, or other data.

In some embodiments, an alert may be generated 614 only after human validation. For example, some or all of the video footage for an individual, a plot of biometric data for the individual, a plot of a risk metric for an individual, a numerical representation of a risk metric, or other data may be presented, or transmitted for presentation, to security personnel along with a prompt to validate an alert if an alert is otherwise found to be appropriate in accordance with the methods disclosed herein. An alert may then be generated 614 only if validation is received from security personnel, such as from a computing device operated by security personnel. In some embodiments, a prompt to validate an alert and presentation of the underlying data may be generated in real-time, e.g. as immediately after the video data is analyzed and a risk detected. In other embodiments, the prompt and presentation of underlying data for review is presented after an alert is generated 614 in order to determine the appropriateness of the alert.

In some embodiments, an alert includes a message displayed on the POS 106a at which the POS measurements were measured. The alert may be displayed in real time, e.g. immediately after the risk has been characterized 612. The alert may include some or all of the information mentioned in the preceding paragraph. In some embodiments, a self-checkout system may include a plurality of POS devices 106a each in the field of view of a camera 302. A cashier may supervise use of the self-checkout POS devices 106a and view a display having the output of these cameras displayed thereon. In some embodiments, a display of a camera imaging a POS 106a may be accompanied with a display of a risk metric for an individual currently using that POS 106a. The risk metric may represent risk using color, text, a graphical representation, or some other means. In some embodiments, the risk metric is only displayed when it exceeds some threshold value.

Figure 7:
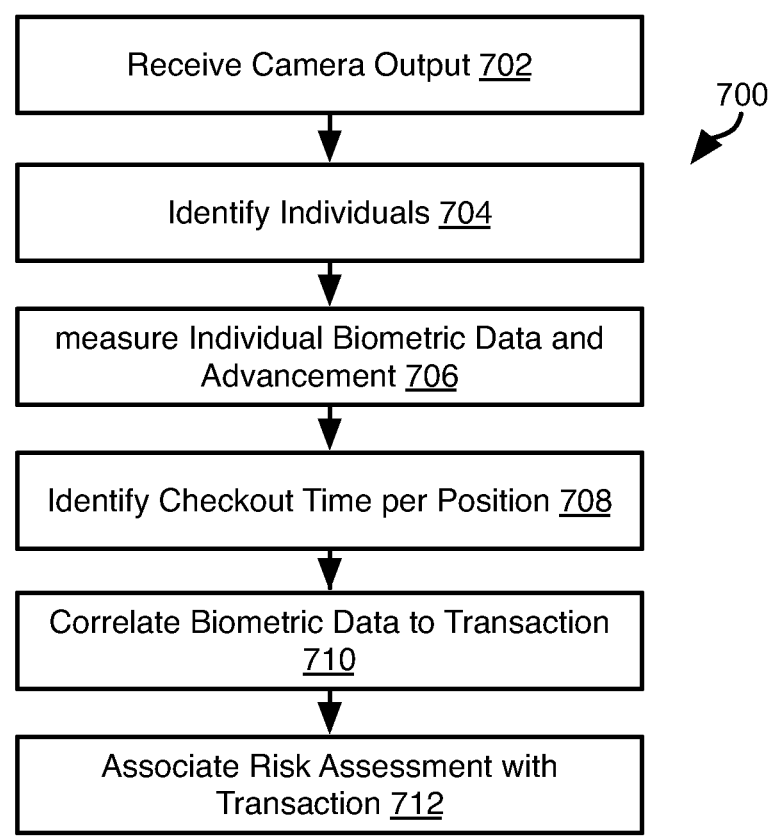
FIG. 7 is a process flow diagram of a method for associating a risk assessment with a transaction in accordance with an embodiment of the present invention.
Figure 8:
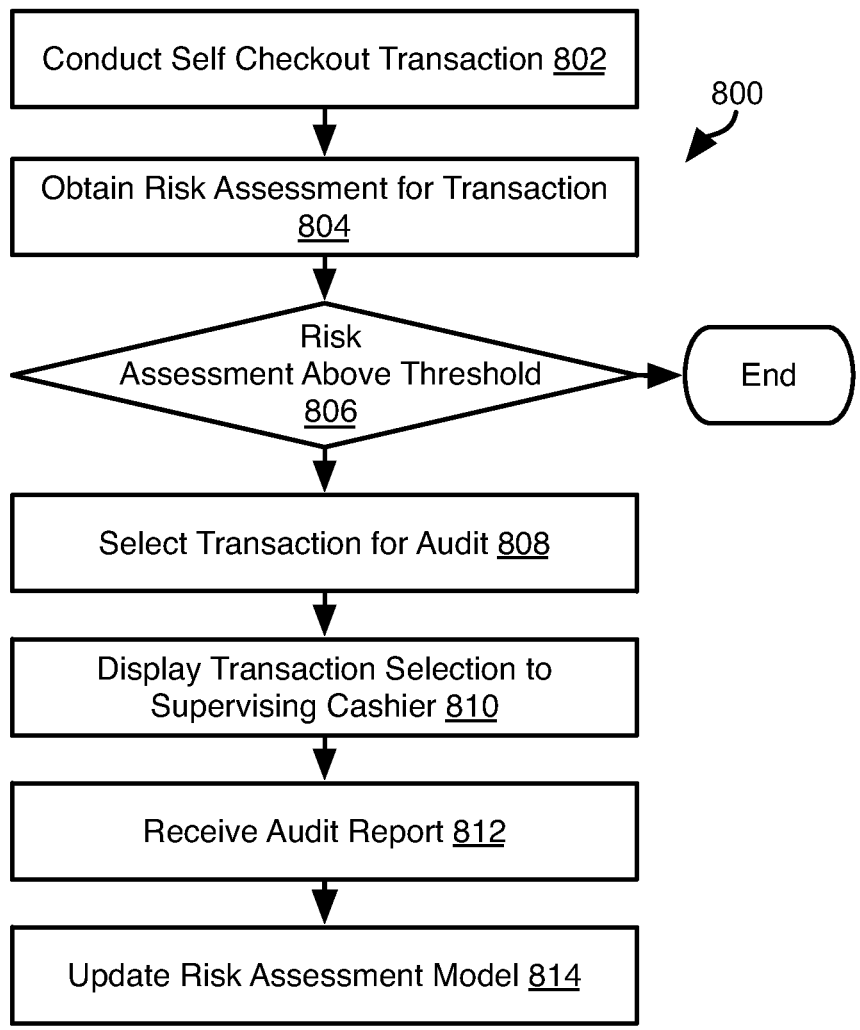
FIG. 8 is a process flow diagram of a method for reducing risk of loss at a self-checkout POS in accordance with an embodiment of the present invention.

Referring to FIGS. 7 and 8, in some embodiments, self-checkout transactions may be audited by a supervising cashier. For example, a number of transactions may be selected for inspection whereby the supervising cashier compares items in a customer's cart or on a customer's person with items purchased in a transaction. The risk estimates calculated according to the methods described above may be used to select transactions for auditing in order to supplement transactions selected randomly or according to the judgment of the supervising cashier. In some embodiments, the alerts displayed to the supervising cashier as described above are sufficient to alert the supervising cashier to conduct an audit of a transaction for an individual identified to be high risk. In other embodiments, the selection may be automated and specific transactions may be identified to the supervising cashier for auditing.

For example, the method 700 of FIG. 7 may be executed by a server system 102 or some other computing device having access to the video data and in data communication with a POS 106a or representative computing device 104a of a supervising cashier. The method 700 may be operable to associate a risk metric with a transaction. The method 700 may include receiving 702 the output of a camera 302 of a queue system 300. The output may then be analyzed to identify 704 in the frames thereof images of individuals and, once an individual has been identified in a frame, identifying movement of that individual within the field of view of the camera throughout the video data. The biometric data of individuals identified may then be measure 706 during that individual's appearance in the video data. For example, once an individual has been identified in the field of view of the camera, the biometric data of that individual may be measured periodically to identify baseline measurements and POS measurements as described above.

A checkout time or window of time in which checkout may have occurred for an individual in the queue may be identified 708 and a transaction occurring at that time may be correlated 710 to the biometric data measured for the individual. Correlation 510 may include comparing the time, or time range, identified for checkout to the time of transactions transacted at the same POS where the video data was captured. The transaction with a time in the time range may then be associated with the biometric data. This may include associating 712 any risk assessment based on this biometric data, such as calculated according to the methods described above, with the transaction.

Referring to FIG. 8, a method 800 may be performed by a server system 102 or some other device that is in data communication with one or more cameras 302 and a POS 106a, 106b. The method 800 may include conducting 802 a self-checkout transaction for an individual. The remaining steps of the method 800 may be performed at any point prior to or after the transaction actually concludes and the individual leaves the POS 106a at which the transaction is conducted.

The method 800 may include obtaining 804 a risk assessment for the individual, such as using the method 700 to relate biometric data for an individual to a transaction. If the risk assessment is found 806 not to be above the threshold, then the method 800 may end and the transaction may be selected for audit or not according to any method known in the art, including random selection or the judgment of the supervising cashier.

If the risk assessment is found 806 to be above a threshold, then the transaction may be selected 808 for auditing and an instruction or prompt to audit the transaction may be displayed 810 or otherwise communicated to a supervising cashier, such as using a representative device 104a operated by the supervising cashier.

In some embodiments, a result of the audit may be received 812 from the supervising cashier, such as from the representative device 104a operated by the supervising cashier. The result of the audit may indicate whether un-purchased items were found on the person or in the cart of the individual associated with the selected transaction. The audit report may simply be one of two possible values, with one indicating no un-purchased items and the other indicating the presence of un-purchased items. The audit report may also indicate more information such as value of the un-purchased items or whether the supervising cashier believes the failure to pay for the un-purchased items to be unintentional.

The received 812 audit report may be used to update 814 a risk assessment model. Each instance where a transaction was selected 808 for audit but no misconduct was found may be a data point, along with the corresponding biometric data, for training a machine learning algorithm. Likewise, each instance where a transaction was selected for audit and un-purchased items were found may likewise be a data point for the machine learning algorithm, along with the corresponding biometric data. In some instances where no audit was invoked for a transaction but by other means shoplifting was found to have occurred, the biometric data for the transaction may also be used as a data point for training the algorithm. The machine learning algorithm may be any machine learning algorithm known in the art.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for detecting shoplifting, the method comprising:
   receiving, by a computer system, a video feed from one or more cameras viewing one or more locations within a store;
   detecting, by the computer system from the video feed, first biometric data comprising a baseline measurement of one or more biological functions of an individual while the individual occupies a first position with respect to a point-of-sale (POS) region within the store;
   detecting, by the computer system from the video feed, second biometric data comprising a subsequent measurement of the one or more biological functions of the individual while the individual occupies a second position with respect to the point-of-sale (POS) region, the second position being spaced from the first position;
   comparing, by the computer system, baseline measurement and the subsequent measurement to identify a change in the one or more biological functions; and
   generating, by the computer system, a risk assessment in accordance with the change.

2. The method of claim 1, further comprising transmitting, by the computer system, an alert to a device of a merchant representative if the risk assessment is above a threshold.

3. The method of claim 2, wherein transmitting the alert occurs while the individual is in the POS region.

4. The method of claim 3, wherein transmitting the alert comprises displaying the alert on a screen of a POS device corresponding to the POS region.

5. The method of claim 2, further comprising:
identifying, by the computer system, a time at which the individual is positioned adjacent a POS terminal, the POS terminal being a self checkout POS terminal; and
correlating, by the computer system, a self-checkout transaction of the individual to the risk assessment using the identified time;
wherein transmitting the alert to the device of the merchant representative if the risk assessment is above the threshold further comprises selecting the self-checkout transaction for inspection and transmitting the selection to the merchant representative.

6. The method of claim 5, wherein the one or more biological functions comprise one or more of heart rate, respiration rate, blinking rate, and temperature.

7. The method of claim 6, further comprising:
receiving, by the computer system, an inspection result corresponding the self-checkout transaction; and
updating, by the computer system, the risk model according to the inspection result.

8. The method of claim 1, wherein: the first position corresponds to the individual being spaced from a POS terminal; and the second position corresponds to the individual being directly adjacent the POS terminal.

9. The method of claim 1, wherein the one or more biological functions comprise a heart rate.

10. The method of claim 1, wherein the one or more biological functions comprise a respiration rate.

11. A system for detecting shoplifting, the system comprising one or more processors and one or more memory devices operably coupled to the one or more processors, the one or more memory devices storing executable and operational code effective to cause the one more processors to:
receive a video feed from one or more cameras viewing one or more locations within a store;
detect, using the video feed, first biometric data comprising a baseline measurement of one or more biological functions of an individual while the individual occupies a first position with respect to a point-of-sale (POS) region within the store;
detect, using the video feed, second biometric data comprising a subsequent measurement of the one or more biological functions of the individual while the individual occupies a second position with respect to the point-of-sale (POS) region, the second position being spaced from the first position;
compare the baseline measurement and the subsequent measurement to identify a change in the one or more biological functions; and
generate a risk assessment in accordance with the change.

12. The system of claim 11, wherein the executable and operational data are further effective to cause the one or more processors to transmit an alert to a device of a merchant representative if the risk assessment is above a threshold.

13. The system of claim 12, wherein the executable and operational data are further effective to cause the one or more processors to transmit the alert while the individual is in the POS region.

14. The system of claim 13, wherein the executable and operational data are further effective to cause the one or more processors to transmit the alert by displaying the alert on a screen of a POS device corresponding to the POS region.

15. The system of claim 12, wherein the executable and operational data are further effective to cause the one or more processors to:
identify a time at which the individual is positioned adjacent a POS terminal, the POS terminal being a self checkout POS terminal;
correlate a self-checkout transaction of the individual to the risk assessment using the identified time; and
transmit the alert to a device of the merchant representative if the risk assessment is above the threshold further comprises selecting the self-checkout transaction for inspection and transmitting the selection to the merchant representative.

16. The system of claim 15, wherein the one or more biological functions comprise one or more of heart rate, respiration rate, blinking rate, and temperature.

17. The system of claim 16, wherein the executable and operational data are further effective to cause the one or more processors to:
receive an inspection result corresponding the self-checkout transaction; and
update the risk model according to the inspection result.

18. The system of claim 11, wherein: the first position corresponds to the individual being spaced from a POS terminal; and the second position corresponds to the individual being directly adjacent the POS terminal; and the executable and operational data are further effective to cause the one or more processors to generate the risk assessment in accordance with the comparison by generating the risk assessment according to both the comparison and one or more actual values of the second biometric data terminal.

19. The system of claim 11, wherein the one or more biological functions comprise a heart rate.

20. The system of claim 11, wherein the one or more biological functions comprise a respiration rate.

* * * * *